United States Patent
Sunvold

(10) Patent No.: US 6,835,400 B2
(45) Date of Patent: Dec. 28, 2004

(54) PROCESS FOR IMPROVING GLUCOSE AND INSULIN METABOLISM IN PET ANIMALS WITH A FOOD COMPOSITION

(75) Inventor: Gregory D. Sunvold, Eaton, OH (US)

(73) Assignee: The Iams Company, Dayton, OH (US)

( * ) Notice: Subject to any disclaimer, the term of this patent is extended or adjusted under 35 U.S.C. 154(b) by 169 days.

(21) Appl. No.: 10/213,405

(22) Filed: Aug. 6, 2002

(65) Prior Publication Data

US 2003/0012807 A1 Jan. 16, 2003

Related U.S. Application Data

(60) Division of application No. 09/268,919, filed on Mar. 16, 1999, now Pat. No. 6,458,378, which is a continuation-in-part of application No. 09/055,538, filed on Apr. 6, 1998, now Pat. No. 5,932,258.

(51) Int. Cl.[7] .............. A23K 1/00; A23K 1/18; A61K 35/78; A01N 65/00; C12P 1/00
(52) U.S. Cl. .......... 424/750; 426/390; 426/623; 426/635; 426/805; 435/41
(58) Field of Search ................. 424/750, 725; 426/390, 623, 635, 805; 435/41; 536/1

(56) References Cited

U.S. PATENT DOCUMENTS

| | | |
|---|---|---|
| 4,828,846 A | 5/1989 | Rasco et al. ............ 426/18 |
| 4,892,748 A | 1/1990 | Andersen et al. |
| 4,895,731 A | 1/1990 | Baker et al. |
| 5,087,623 A | 2/1992 | Boynton et al. |
| 5,175,156 A | 12/1992 | Boynton et al. |
| 5,186,961 A | 2/1993 | Shih et al. |
| 5,468,510 A | 11/1995 | Christensen et al. |
| 5,527,553 A | 6/1996 | Kazemzadeh |
| 5,558,366 A | 9/1996 | Gallaher et al. |
| 5,576,306 A | 11/1996 | Dressman et al. |
| 5,587,193 A | 12/1996 | Kazemzadeh |
| 5,605,893 A | 2/1997 | Kaufman |
| 5,616,569 A | 4/1997 | Reinhart ............ 514/54 |
| 5,851,573 A | 12/1998 | Lepine et al. |
| 5,932,258 A | 8/1999 | Sunvold ............ 426/2 |
| 5,976,598 A | 11/1999 | Akkaway et al. |
| 6,197,100 B1 | 3/2001 | Melbouci |
| 6,238,708 B1 | 5/2001 | Hayek et al. |

OTHER PUBLICATIONS

"Purina CNM Veterinary Product Guide", (1994).
Liang,et al., "Effect of Pressure, Moisture, and Cooking Time on Susceptibility of Corn or Sorghum Grain Starch to enzymatic Attack", *Journal of Dairy Science, vol. 53*, Jan.–Dec. 1970, 336–341.

*Primary Examiner*—David Naff
*Assistant Examiner*—Deborah K. Ware
(74) *Attorney, Agent, or Firm*—Kelly L. McDow-Dunham; Karen E. Clark

(57) ABSTRACT

A composition and process of using it are provided to improve glucose and insulin metabolism in pet animals by controlling the postprandial glycemic and/or insulin response in those animals. The composition includes a source of protein, a source of fat, and a source of carbohydrates from a multiple grain source containing a blend of sorghum and barley; a blend of corn and barley; or a blend of corn, sorghum and barley.

10 Claims, 2 Drawing Sheets

PROCESS FOR IMPROVING GLUCOSE AND INSULIN METABOLISM IN PET ANIMALS WITH A FOOD COMPOSITION

CROSS REFERENCE TO RELATED APPLICATIONS

This application is a divisional of U.S. patent application Ser. No. 09/268,919, filed Mar. 16, 1999, now U.S. Pat. No. 6,458,378, which is a continuation in part of U.S. patent application Ser. No. 09/055,538, filed Apr. 6, 1998, now U.S. Pat. No. 5,932,258.

BACKGROUND OF THE INVENTION

The present invention relates to a composition and process of using it to improve glucose and/or insulin metabolism in companion animals such as the dog and cat.

Several different conditions are associated with impaired glucose metabolism in companion animals such as the dog and cat. These include diabetes (both insulin dependent type and non-insulin dependent maturity onset type), obesity, geriatrics, and gestation (pregnancy). It is estimated that one out of every 100 dogs seen by a practicing veterinarian is diabetic. Obesity is estimated to occur in approximately 40% of the dog population. Of course, older companion animals (approximately 10% of the U.S. dog and cat populations are believed to be 11 years of age or older) and pregnant animals are common. Accordingly, there is a substantial percentage of the dog and cat population which are in categories associated with risk of having or developing problems with glucose metabolism.

Additionally, the diagnosis of diabetes or impaired glucose metabolism in dogs and cats usually only occurs after a hyperglycemic episode for the animal. Thus, animals which are borderline diabetics, or otherwise have moderately impaired glucose metabolisms, run a significant risk of not being diagnosed with diabetes until their condition has progressed and unmistakable symptoms have manifested themselves.

Ingestion of a meal results in a postprandial glucose response. This response is characterized by a surge in blood glucose. Insulin is the body's primary hormone that is used to store blood glucose. Thus, blood insulin levels generally go up after a meal as well as glucose. A relatively low insulin response to a meal indirectly indicates that postprandial glucose absorption was minimal. Thus, a means to prevent this "surge" in glucose and insulin after a meal would be advantageous to an animal with impaired glucose metabolism.

Another associated metabolic disorder with obesity and diabetes is hyperinsulinemia. Hyperinsulinemia is the presence of insulin at abnormally high levels in the blood. Counteracting the effects of hyperinsulinemia by lowering insulin levels in the blood can help lessen the progression of obesity and diabetes.

There have been attempts made in the past to control diabetics not only with drug therapy, but also with diet. Dietary fiber has been found to have an effect on controlling diabetes under certain circumstances. The addition of certain soluble fibers such as guar and pectin have been found to yield a reduced postprandial rise in blood glucose levels. However, not all soluble fibers provide benefits, and some result in undesirable side effects for the animal including diarrhea, flatulence, and abdominal cramping.

It would be desirable to be able to regulate and improve glucose and/or insulin metabolism in animals having impaired glucose and/or insulin metabolism. It would also be desirable to be able to regulate and improve glucose and/or insulin metabolism in even seemingly healthy animals with no overt symptoms to prevent the onset of a chronic diabetic condition. Accordingly, there still remains a need in the art to manage and improve glucose and/or insulin metabolism in a companion animal through diet to prevent or mediate the onset of impaired glucose and/or insulin function in an obese, geriatric, or diabetic companion animal.

SUMMARY OF THE INVENTION

The present invention meets these needs by providing a composition and process of using it to improve glucose and/or insulin metabolism in companion animals by controlling the postprandial glycemic and insulin responses in those animals. In accordance with one aspect of the present invention, a pet food composition is provided and includes a source of protein, a source of fat, and a source of carbohydrates from a multiple grain source comprising a blend of sorghum and barley; a blend of corn and barley; a blend of corn and sorghum; or a blend of corn, sorghum, and barley. Preferably, the weight ratio of grain sources in the preferred blends is from about 1:5 to about 5:1, and more preferably the weight ratio of the preferred blends contains approximately equal amounts of each grain (i.e., a 1:1 ratio). Where a combination of three grain sources is used, the weight ratios of the lowest to highest amount of grain source will vary between from about 1:1 to about 5:1.

Preferably, the composition comprises from about 20 to about 40% crude protein, from about 4 to about 30% fat, from about 4 to about 20% total dietary fiber, and a source of starch which includes a blend of grain sources as previously described, although no specific ratios or percentages of these nutrients are required.

The pet food composition may optionally include chromium tripicolinate and a water soluble, cellulose ether. Additionally, the pet food composition may further include from about 1 to about 11 weight percent of supplemental total dietary fiber of fermentable fibers which have an organic matter disappearance of 15 to 60 weight percent when fermented by fecal bacteria for a 24 hour period.

The invention also includes a process for controlling postprandial glycemic response in a companion animal comprising the step of feeding the companion animal a pet food composition consisting essentially of a source of protein, a source of fat, and a source of carbohydrates from a multiple grain source comprising a blend of sorghum and barley; a blend of corn and barley; a blend of corn and sorghum; or a blend of corn, sorghum, and barley. The invention also includes a process for controlling hyperinsulinemia in a companion animal comprising the step of feeding the companion animal a pet food composition consisting essentially of a source of protein, a source of fat, and a source of carbohydrates from a multiple grain source comprising a blend of sorghum and barley; a blend of corn and barley; a blend of corn and sorghum; or a blend of corn, sorghum, and barley.

Accordingly, it is a feature of the present invention to provide a composition and process of using it to improve glucose and/or insulin metabolism in companion animals by controlling the postprandial glycemic and/or insulin response in those animals. This, and other features and advantages of the present invention, will become apparent from the following detailed description, the accompanying drawings, and the appended claims.

DETAILED DESCRIPTION OF THE PREFERRED EMBODIMENT

Figure 1:
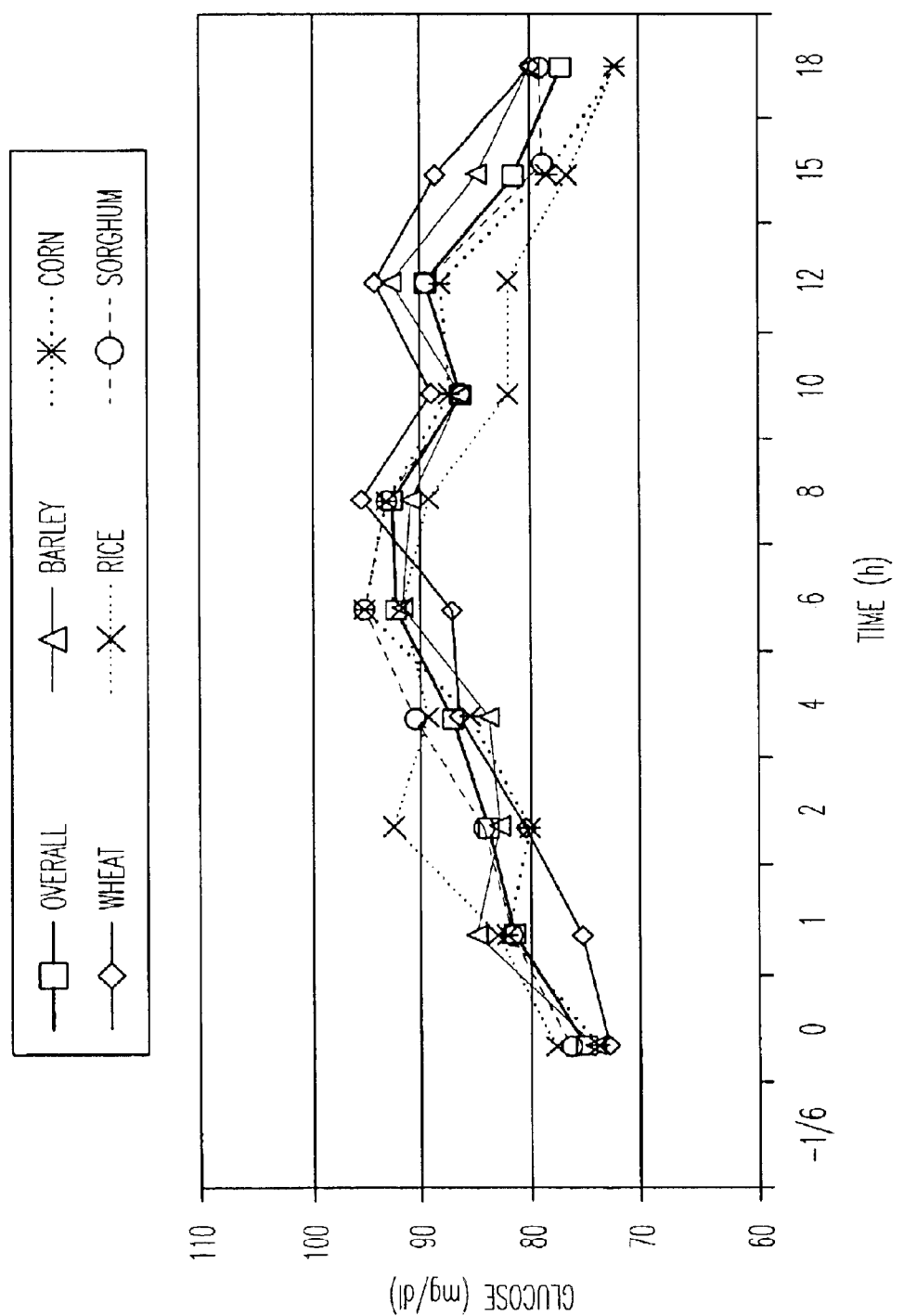
FIG. 1 is a graph of the influence of the diet of the present invention on glucose (mg/dl) at selected times (minutes) after diet consumption in cats.

The present invention utilizes a pet food composition which contains a multiple grain source which includes a blend of sorghum and barley; a blend of corn and sorghum; a blend of corn and barley; or a blend of corn, sorghum, and barley as starch sources to control the postprandial rise of both glucose and insulin levels in a companion animal. The use of additional grain sources in the present invention is optional. As used herein, "multiple grain source" means at least two different grain sources. Through the use of a multiple grain source, the diet of the animal aids in regulating the animal's glucose metabolism and insulin response after meals in an effective manner. Both healthy animals, as well as animals suffering from diabetes, obesity, hyperinsulinemia, geriatric animals, and pregnant animals will benefit from being fed the composition of the present invention.

The composition also optionally contains other ingredients which also have the effect of minimizing the postprandial glycemic and/or insulin response in an animal. The composition may include chromium tripicolinate in an amount of from between about 10 to about 500 micrograms of chromium per day. Chromium tripicolinate occurs in brewer's yeast, and the yeast may be added to the pet food composition. Alternatively, the chromium tripicolinate may be added to the composition in a substantially pure form.

The composition may also contain a water soluble cellulose ether such as, for example, carboxymethyl cellulose or hydroxypropylmethyl cellulose ether (HPMC). If carboxymethyl cellulose is used, it is preferably a high viscosity composition in the range of from about 5,000 to about 65,000 cps and is added to the composition in an amount of approximately 1% by weight. If HPMC is utilized, it is preferably also a high viscosity composition in the range of from about 10,000 to about 2,000,000 cps and is added to the composition in an amount of from about 1–2% by weight. A suitable grade of HPMC is available from The Dow Chemical Company under the designation METHOCEL™ K-100M. It has been found that such water soluble cellulose ethers have the effect of delaying the postprandial rise of glucose levels in the animal's blood.

The pet food composition of the present invention may also optionally contain a source of fermentable fibers which display certain organic matter disappearance percentages. The fermentable fibers which may be used have an organic matter disappearance (OMD) of from about 15 to 60 percent when fermented by fecal bacteria in vitro for a 24 hour period. That is, from about 15 to 60 percent of the total organic matter originally present is fermented and converted by the fecal bacteria. The organic matter disappearance of the fibers is preferably 20 to 50 percent, and most preferably is 30 to 40 percent.

Thus, in vitro OMD percentage may be calculated as follows:

$$\{1-[(OM\ \text{residue} - OM\ \text{blank})/OM\ \text{initial}]\} \times 100,$$

where OM residue is the organic matter recovered after 24 hours of fermentation, OM blank is the organic matter recovered in corresponding blank tubes (i.e., tubes containing medium and diluted feces, but no substrate), and OM initial is that organic matter placed into the tube prior to fermentation. Additional details of the procedure are found in Sunvold et al, J. Anim. Sci. 1995, vol. 73:1099–1109.

The pet food composition can be any suitable pet food formula which also provides adequate nutrition for the animal. For example, a typical canine or feline diet for use in the present invention may contain from about 20 to about 40% crude protein (and preferably about 25 to about 35%), from about 4 to about 30% fat (and preferably about 8 to about 12%), and from about 4 to about 20% total dietary fiber, along with the multiple starch source, all percentages by weight. However, no specific ratios or percentages of these nutrients are required.

The fermentable fibers may be any fiber source which intestinal bacteria present in the animal can ferment to produce significant quantities of SCFAs.

"Significant quantities" of SCFAs, for purposes of this invention, are amounts over 0.5 mmol of total SCFAs/gram of substrate in a 24 hour period. Preferred fibers include beet pulp, gum arabic (including gum talha), psyllium, rice bran, carob bean gum, citrus pulp, pectin, fructooligosaccharides and inulin, mannanoligosaccharides and mixtures of these fibers.

The fermentable fibers are used in the pet food composition in amounts from 1 to 11 weight percent of supplemental total dietary fiber, preferably from 2 to 9 weight percent, more preferably from 3 to 7 weight percent, and most preferably from 4 to 7 weight percent.

A definition of "supplemental total dietary fiber" first requires an explanation of "total dietary fiber". "Total dietary fiber" is defined as the residue of plant food which is resistant to hydrolysis by animal digestive enzymes. The main components of total dietary fiber are cellulose, hemicellulose, pectin, lignin and gums (as opposed to "crude fiber", which only contains some forms of cellulose and lignin). "Supplemental total dietary fiber" is that dietary fiber which is added to a food product above and beyond any dietary fiber naturally present in other components of the food product. Also, a "fiber source" is considered such when it consists predominantly of fiber.

In order that the invention may be more readily understood, reference is made to the following example which is intended to illustrate the invention, but not limit the scope thereof.

EXAMPLE 1

Thirty adult intact female Domestic Short Hair cats (from Sinclair Research Center, Columbia, Mo.) were used. The cats were housed individually according to AAALAC (American Association for Accreditation of Laboratory Animal Care) standards. All procedures were reviewed and approved by the Institutional Animal Care and Use Committee and the cats were treated humanely and ethically during the entire study period. The animals were vaccinated against rhinotracheitis virus, calicivirus, and panleukopenia virus. The cats were parasite free. The average body weight of the cats was 3.66 kg±0.99 (SEM (standard error of the mean), range: 2.36 to 6.19 kg) at the initiation of the study. Fresh water was provided ad libitum during the entire period of study.

Calculated amount of food to maintain body weight was provided to the cats daily. Because the cats had to consume their food rapidly during the glycemic challenge, the period of food presentation was gradually reduced during the stabilization period to one hour daily. The cats appeared to adjust very well to a limited time of food presentation. None of the animals were sick or required medical attention during the study period.

Five dietary treatments were evaluated in a three replicate cross-over design. Following a seven week stabilization period, the cats were randomized based on body weight and serum glucose levels into five dietary treatment groups of six cats each for the first replicate. The cats were re-randomized and assigned to a different experimental diet for the second and third replicate. Each replicate lasted a minimum of three weeks and a glycemic response test was performed at the end of each replicate.

Glycemic response tests were performed at the end of each replicate. The cats were fasted for 24 hours prior to the initiation of the glycemic test. The day before the glycemic response test, the catheterization site was shaved, aseptically prepared, and the jugular vein was catheterized under light sedation. The sedation regimen consisted of the combination ketamine (10 mg/lb) and diazepam (0.5 mg/lb) administered intravenously. Blood samples were in syringes and transferred in evacuated tubes containing no anticoagulant (Terumo® Venoject tubes (7.0 ml), available from Terumo Medical Corporation, Elkton, Md.).

Two baseline samples were collected approximately ten minutes apart. Immediately after the last baseline sample was collected, the cats were fed 1.09% of body weight and allowed a maximum of 15 minutes to eat the experimental diets. This food intake (1.09% of body weight) consisted of half the daily food intake during the seven week stabilization. Cats not consuming the experimental diet within 15 minutes were excluded from the glycemic test for that day and retested the next day. Time 0 corresponded to the end of the food intake.

Additional blood samples were collected at 1, 2, 4, 6, 8, 10, 12, 15, 18 hours after the food was consumed. The blood samples were centrifuged at 1300×g for 15 minutes and two serum aliquots from each time point were frozen within two hours of collection. Serum glucose concentrations (mg/dl) were determined by hexokinase enzyme method (Cobas Mira, Roche Diagnostic System, Sommerville, N.J.) and insulin ($\mu$IU/ml) was determined by standard radioimmunoassay method using RIA kit (DPC Diagnostic Products Corporation, Los Angeles, Calif.).

The ingredient composition of experimental diets is presented in Table 1 below.

TABLE 1

Ingredient composition of starch diets

| Ingredient | Corn | Wheat | Barley | Rice | Sorghum |
|---|---|---|---|---|---|
| Starch source* | 45.4 | 48.0 | 56.1 | 38.1 | 45.0 |
| Poultry by-product meal | 39.5 | 35.5 | 25.6 | 46.6 | 40.0 |
| Beet pulp | 5.0 | 5.0 | 5.0 | 5.0 | 5.0 |
| Poultry fat | 1.6 | 3.0 | 4.0 | 2.0 | 1.7 |
| Dried egg product | 2.0 | 2.0 | 2.0 | 2.0 | 2.0 |
| Chicken digest | 2.0 | 2.0 | 2.0 | 2.0 | 2.0 |
| Brewer's yeast | 1.0 | 1.0 | 1.0 | 1.0 | 1.0 |
| Fish meal | 1.0 | 1.0 | 1.0 | 1.0 | 1.0 |
| Minerals | 1.5 | 1.5 | 2.2 | 1.5 | 1.4 |
| Vitamins | 0.6 | 0.6 | 0.6 | 0.5 | 0.6 |
| DL-Methionine | 0.4 | 0.4 | 0.5 | 0.3 | 0.3 |

*Respective cereal flours for each diet.

During the study period, five experimental diets were evaluated. All the diets were formulated to contain equal starch content (approximately 30%) from different cereal sources as listed above (corn, wheat, barley, rice, and sorghum). To achieve this, protein levels were allowed to vary. The experimental diets were processed similarly with each starch source consisting of whole grain without the hull. Individual daily feed allowances were based on the stabilization period intake.

The nutrients in the diets were analyzed by AOCS-AOAC methods (Association of Official Analytical Chemists—*Official Methods of Analysis*, Arlington, Va., 1994.). Protein was determined by Leco combustion analyzer (AOAC 990.03), fat was determined by acid hydrolysis (AOAC 920.39), crude fiber was determined by Fibertec (AOAC 973.18), moisture was determined by drying sample at 135° C. for 2 hours (AOAC 30.15), and total ash was determined by incinerating the sample at 600° C. for 4 hours (AOAC 920.39). Nitrogen-free-extract (NFE) was computed as the difference between 100% and the sum of protein, fat, fiber, ash and water content. Calcium and phosphorus contents of the diets were determined by atomic absorption spectrophotometer (AOAC 968.08) and Vanado-Molybdate method (AOAC 965.15) respectively. Starch was assayed quantitatively (Bondar, R. J. L., and D. C. Mead, "Evaluation of glucose-6-phosphate dehydrogenase from Leuconostoc mesenteroides in the hexokinase method for determining glucose in starch," Clin. Chem. 20:586 (1974); MacRae, J. C., and D. G. Armstrong, J. Sci. Food Agric. 19:578 (1966)), $\beta$-glucan fractions were enzymatically quantitated (AOAC 995.16), and total dietary fiber was assayed by the standard enzymatic/gravimetric procedure (AOAC 991.43).

The variables measured for statistical analysis were: insulin and glucose levels at each time point and their respective peak, time to peak, overall averages, and areas under the curves. The glucose and insulin baseline levels were calculated as the average of both baseline samples. Different areas under the curves were calculated for both glucose and insulin: 1) total area under the curve (AUC) and 2) area under the curve before and after the 4 hour time point (AUC<4 and AUC>4, respectively).

The general linear model procedure of SAS (statistical analysis system) was used for three sets of analyses. The first studied time-dependent response and investigated linear, quadratic, and cubic time trend, all orthogonally. The classification included source for treatment, time, and treatment by time interaction. The second analysis was for variance for all the variables measured and calculated. The classification included source for replicate, treatment, and replicate-treatment interaction. The third analysis was for covariance with "gain while on the treatment" as a covariate. This violates one of the covariance analysis requirements, but is believed to offer some information about the effects of body weight change on response. The classification was the same as for the second analysis. All mean separations were by a 5% least significant difference (LSD). The LSD was used if the experiment-wise F-test was rejected at $\alpha$<0.10.

The chemical composition of experimental diets is summarized in Table 2 below.

TABLE 2

Diet Composition

| Nutrients | Wheat | Barley | Rice | Corn | Sorghum |
|---|---|---|---|---|---|
| Protein* | 36.1 | 30.9 | 41.5 | 37.6 | 38.5 |
| Ash | 7.3 | 7.5 | 8.1 | 7.5 | 7.8 |
| Fat | 12.2 | 12.2 | 11.4 | 11.4 | 11.6 |
| TDF | 11.8 | 17.0 | 6.9 | 9.9 | 6.5 |
| NFE | 32.4 | 32.4 | 32.2 | 33.5 | 35.7 |
| Calcium | 1.3 | 1.2 | 1.6 | 1.3 | 1.4 |
| Phosphorus | 1.1 | 1.0 | 1.2 | 1.2 | 1.2 |
| Beta Glucans | ND** | 0.02 | ND | ND | ND |
| Starch | 33.2 | 32.3 | 34.0 | 34.6 | 34.6 |

*All values expressed on a percent dry matter basis.
**Not detectable.

The dry matter and starch contents were similar in all diets (91.7 to 93.6 wt % and 32.3 to 34.6 wt %, respectively). The fat content varied from 11.4 (rice) to 12.2 wt % (barley) and protein from 30.9 (barley) to 41.5 wt % (rice). The NFE content was highest for sorghum (35.7 wt %) and lowest for rice (32.2 wt %). Total dietary fiber was highest (17.0 wt %) for barley and lowest for sorghum (6.5 wt %).

For glucose response, a strong time-diet interaction (P<0.01) was detected. The orthogonal analysis indicated that rice had a significantly different (P<0.05) linear trend than wheat, barley, and sorghum, but not quite different from corn (P<0.10). Wheat had also a different linear trend (P<0.05) than rice, corn, and sorghum base diets but similar to barley. No differences between diets were noted for the quadratic and cubic trends.

Table 3 below summarizes the postprandial glucose levels at different time points. Dietary regimens did not influence glucose levels at most time points (baseline, 1, 4, 6, 8, 10, and 18 hours after feeding), but significant differences were observed at 2, 12, and 15 hours. At two hours post-prandial, rice resulted in the greatest (P<0.05) glucose level compared to other starch sources. See FIG. 1 for a graphical representation of the data from Table 3. Wheat, barley and corn resulted in the lowest (P<0.05) glucose levels.

In summary, all diets had similar glucose values at baseline and 18 hours post-prandial. Rice resulted in a rapid elevation of glucose levels but declined quickly indicating both hyper- and hypoglycemic effects. Wheat had a moderate rise in glucose levels followed by a prolonged decline in glucose levels. The most desirable effects occurred for corn, sorghum, and barley with a more attenuated rise and decline in glucose response compared to the other diets.

For insulin response in the animals, a strong diet and time by diet interaction (P<0.001) was detected. The orthogonal analysis indicated that rice had a significantly different

TABLE 3

Influence of experimental diets on glucose (mg/dl)[1] at selected times (hours) after diet consumption in adult cats.

| Diets | Baseline | 1 | 2 | 4 | 6 | 8 | 10 | 12 | 15 | 18 |
|---|---|---|---|---|---|---|---|---|---|---|
| Wheat | 72.8 ± 2.8 | 75.5 ± 2.2 | 80.5 ± 2.3[a] | 86.8 ± 5.0 | 87.3 ± 4.7 | 95.8 ± 4.9 | 89.1 ± 3.4 | 94.6 ± 2.7[a] | 88.6 ± 3.2[c] | 80.4 ± 3.0 |
| Barley | 74.6 ± 2.4 | 85.2 ± 6.3 | 83.1 ± 2.7[a] | 83.9 ± 4.2 | 92.1 ± 6.5 | 91.1 ± 4.1 | 86.4 ± 3.3 | 93.3 ± 3.7[a] | 85.1 ± 4.3[b,c] | 80.1 ± 4.2 |
| Rice | 78.2 ± 2.4 | 83.4 ± 4.3 | 92.9 ± 5.5[b] | 89.4 ± 5.6 | 91.9 ± 4.2 | 89.5 ± 2.7 | 82.3 ± 2.8 | 82.3 ± 3.0[b] | 76.8 ± 2.7[a] | 72.6 ± 2.2 |
| Corn | 73.2 ± 2.5 | 82.4 ± 3.0 | 80.3 ± 3.0[a] | 85.7 ± 3.6 | 95.4 ± 4.4 | 93.2 ± 2.4 | 87.4 ± 3.6 | 88.5 ± 2.6[a,b] | 78.6 ± 2.5[a,b] | 72.6 ± 1.8 |
| Sorghum | 77.2 ± 3.6 | 81.3 ± 2.6 | 84.4 ± 2.8[a,b] | 90.9 ± 3.5 | 95.4 ± 3.8 | 93.3 ± 2.2 | 86.1 ± 2.2 | 90.1 ± 3.3[a,b] | 78.9 ± 2.3[a,b] | 79.7 ± 2.9 |

[1]Values are expressed as mean ± SEM, means within columns having different superscripts are significantly different (P < 0.05).

At 12 hours post-prandial, wheat had the greatest (P<0.05) glucose level while rice resulted in the lowest (P<0.05) glucose level. See FIG. 1. At 15 hours post-prandial, wheat and barley resulted in the greatest (P<0.05) glucose level while rice resulted in the lowest (P<0.05) glucose level.

Barley resulted in a delayed (P<0.05) time to peak glucose compared to other starch sources as shown by Table 4 below. Rice resulted in the numerically greatest glucose AUC<4 but the lowest (P<0.05) glucose AUC>4.

(P<0.05) linear trend than that of wheat, barley, corn, or sorghum. Wheat, barley, corn, and sorghum-based diets had similar linear trends. No differences between diets were noted for quadratic and cubic trends.

Table 5 below summarizes the insulin levels at different time points. Dietary regimens did not influence insulin response at 8, 10, 12, 15, and 18 hour time points, but significant differences were observed at baseline, 1, 2, 4, and 6 hours.

TABLE 4

Effect of experimental diets on postprandial glucose overall averages and peak areas.

| Diet | Average Glucose[1] (mg/dl) | Time Peak (h) | AUC[¶] (mg[h]/dl) | AUC < 4[¶] (mg[h]/dl) | AUC > 4[¶] (mg[h]/dl) |
|---|---|---|---|---|---|
| Wheat | 86.6 ± 1.6 | 8.9 ± 0.7[a,b] | 1527.9 ± 30.1 | 420.1 ± 18.0 | 1103.4 ± 17.5[c] |
| Barley | 86.8 ± 3.0 | 10.3 ± 1.0[a] | 1440.0 ± 75.2 | 429.3 ± 26.8 | 1021.0 ± 50.2[a,b] |
| Rice | 84.2 ± 2.1 | 6.9 ± 1.2[b] | 1413.8 ± 38.4 | 466.7 ± 25.1 | 957.4 ± 23.6[a] |
| Corn | 85.1 ± 1.8 | 8.6 ± 0.8[a,b] | 1437.2 ± 41.7 | 423.1 ± 16.9 | 1014.3 ± 28.7[a,b] |
| Sorghum | 86.7 ± 1.4 | 7.2 ± 0.8[b] | 1482.2 ± 33.4 | 448.5 ± 14.6 | 1029.7 ± 24.2[b,c] |

[¶]AUC: Total area under the curve; AUC < 4: Area under the curve before the 4 hour time point; AUC > 4: Area under the curve after the 4 hour time point.
[1]Average of all time points

TABLE 5

Influence of experimental diets on insulin ($\mu$IU/ml)[1] at selected times (hours) after diet consumption in adult cats.

| Diets | Baseline | 1 | 2 | 4 | 6 |
|---|---|---|---|---|---|
| Wheat | 5.89 ± 0.85[a,b] | 9.10 ± 1.76[a] | 10.73 ± 2.0[a,b] | 12.44 ± 1.58[a] | 12.17 ± 1.6[a,b] |
| Barley | 4.88 ± .51[a] | 10.93 ± 2.18[a] | 9.91 ± 1.53[a] | 10.76 ± 1.53[a] | 11.35 ± 2.14[a] |
| Rice | 8.32 ± 2.03[b] | 16.58 ± 2.71[b] | 15.66 ± 2.56[b] | 17.89 ± 2.75[b] | 15.51 ± 1.61[b] |
| Corn | 4.04 ± 0.46[a] | 8.03 ± 1.07[a] | 10.49 ± 2.15[a] | 9.90 ± 1.44[a] | 10.34 ± 1.06[a] |
| Sorghum | 4.58 ± 0.39[a] | 8.90 ± 0.91[a] | 8.24 ± 1.14[a] | 10.57 ± 1.10[a] | 11.54 ± 1.72[a] |

| Diets | 8 | 10 | 12 | 15 | 18 |
|---|---|---|---|---|---|
| Wheat | 11.12 ± 1.10 | 9.27 ± 1.38 | 10.38 ± 1.81 | 9.70 ± 1.93 | 7.42 ± 1.44 |
| Barley | 9.31 ± 1.34 | 8.39 ± 1.32 | 9.11 ± 1.24 | 7.24 ± 1.63 | 5.58 ± 1.17 |
| Rice | 12.19 ± 1.13 | 9.23 ± 1.17 | 9.66 ± 1.44 | 7.56 ± 1.40 | 4.95 ± 0.38 |
| Corn | 9.17 ± 1.29 | 7.64 ± 1.08 | 7.43 ± 1.21 | 5.81 ± 1.06 | 4.74 ± 0.77 |
| Sorghum | 10.89 ± 1.71 | 7.65 ± 1.22 | 7.20 ± 1.11 | 5.80 ± 0.75 | 6.20 ± 1.17 |

[1]Values are expressed as mean ± SEM, means within columns having different superscripts are significantly different ($P < 0.05$).

Figure 2:
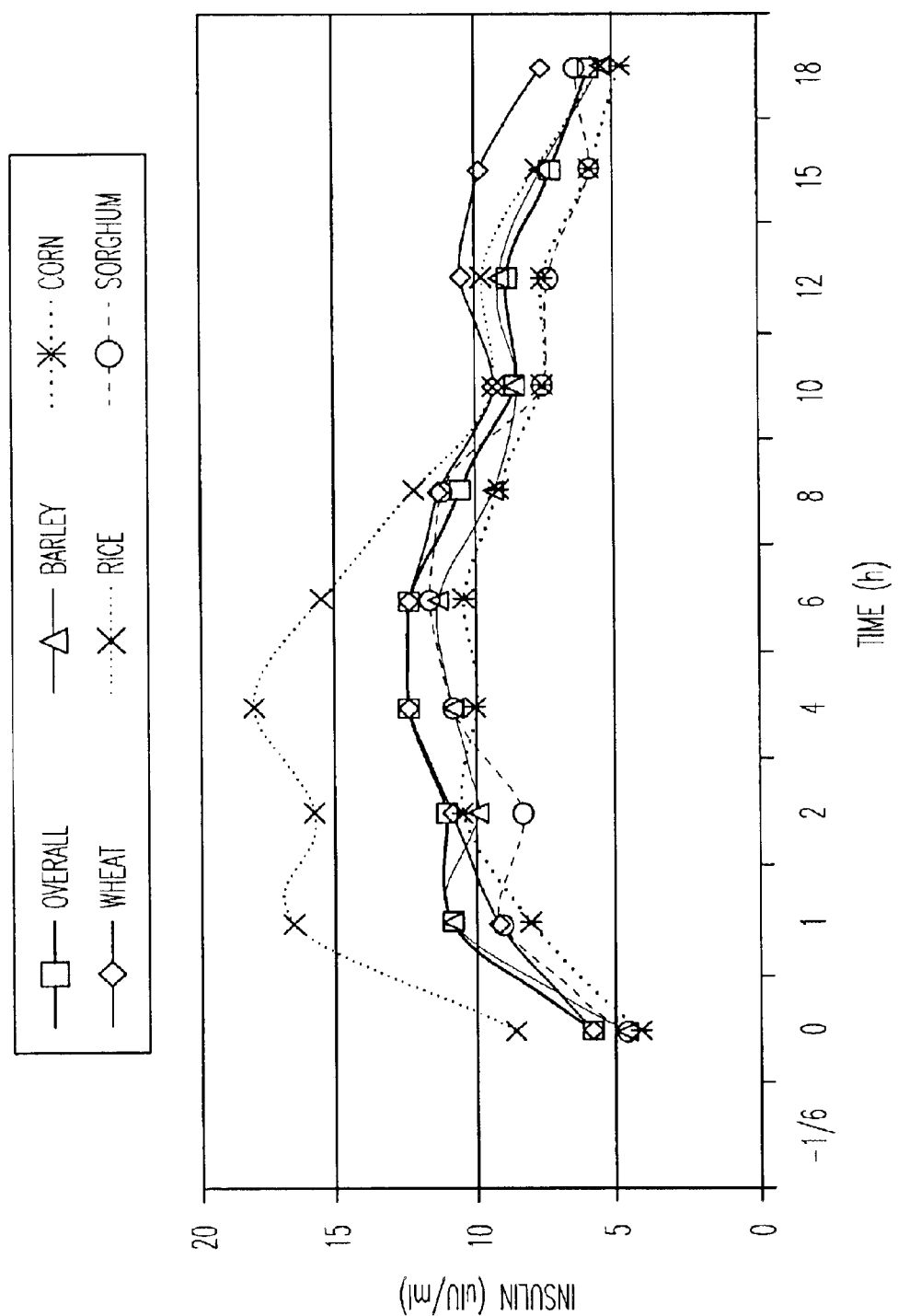
FIG. 2 is a graph of the influence of the diet of the present invention on insulin ($\mu$U/dl) at selected times (minutes) after diet consumption in cats.

Rice resulted in higher ($P<0.05$) insulin levels at baseline, 1, 2, 4, and 6 hour time points than the other diets, except for wheat, which had a similar insulin response at baseline, 2, and 6 hour time points. See FIG. 2 which is a graphical representation of the data presented in Table 5. The insulin response was generally lowest for barley, corn and sorghum.

The insulin overall average and peak for rice were significantly higher ($P<0.05$) than the ones for barley, corn and sorghum, but not different than wheat as shown in Table 6 below. The insulin AUC<4 for rice was significantly higher ($P<0.05$) than the other sources of starch.

TABLE 6

Effect of experimental diets on postprandial insulin overall averages and peak areas

| Diet | Average Insulin ($\mu$IU/ml) | Time Peak (h) | AUC[¶] ($\mu$IU[h]/ml) | AUC < 4[¶] ($\mu$IU[h]/ml) | AUC > 4[¶] ($\mu$IU[h]/ml) |
|---|---|---|---|---|---|
| Wheat | 10.2 ± 1.3[a,b] | 5.9 ± 0.7 | 179.8 ± 27.1 | 59.6 ± 8.3[a] | 118.0 ± 19.2 |
| Barley | 9.0 ± 1.2[a] | 5.6 ± 1.1 | 158.3 ± 24.8 | 54.8 ± 8.1[a] | 103.9 ± 17.5 |
| Rice | 12.1 ± 1.2[b] | 5.4 ± 1.0 | 200.9 ± 21.0 | 84.5 ± 12.0[b] | 115.1 ± 11.6 |
| Corn | 8.2 ± 0.9[a] | 5.2 ± 0.9 | 135.4 ± 14.4 | 50.6 ± 7.1[a] | 89.9 ± 12.1 |
| Sorghum | 8.6 ± 1.0[a] | 5.8 ± 0.9 | 146.8 ± 18.5 | 49.1 ± 5.5[a] | 95.4 ± 12.9 |

[¶]AUC: Total area under the curve; AUC < 4: Area under the curve before the 4 hour time point; AUC > 4: Area under the curve after the 4 hour time point.
[1]Average of all time points In summary, rice, followed by wheat, resulted in a higher insulin response within the first six hours of the challenge. For all insulin variables measured, barley, corn, and sorghum did not result in a different ($P>0.05$) insulin response.

Compared to rice, corn, sorghum and barley generally resulted in a gradual rise and decline in glucose response. Further, compared to rice, corn, sorghum and barley generally resulted in a lower insulin response. Blends of corn and sorghum, or sorghum and barley, or corn and barley, or corn, sorghum, and barley would give the combined effect of decreasing both postprandial blood glucose and insulin levels after a meal. Because barley, corn, and sorghum sources help reduce insulin levels, this would be of practical interest in controlling hyperinsulinemia as well.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for controlling postprandial glycemic response in a pet comprising the step of feeding said pet, a pet food composition comprising a source of protein, a source of fat, and a source of carbohydrates from a multiple grain source comprising a blend of sorghum and barley; a blend of corn and barley; or a blend of corn, sorghum, and barley.

2. A process as claimed in claim 1 in which the weight ratio of grain sources is from about 1:5 to about 5:1.

3. A process as claimed in claim 1 in which the weight ratio of grain sources is about 1:1.

4. A process as claimed in claim 1 in which said pet food composition further includes chromium tripicolinate.

5. A process as claimed in claim 1 in which said pet food composition further includes a water soluble, cellulose ether.

6. A process as claimed in claim 1 in which said pet food composition further includes from about 1 to about 11 weight percent of supplemental total dietary fiber of fermentable fibers which have an organic matter disappearance of 15 to 60 weight percent when fermented by fecal bacteria for a 24 hour period.

7. A process for controlling postprandial glycemic response in a pet comprising the step of feeding said pet a pet food composition comprising from about 20 to about 40% crude protein, from about 4 to about 30% fat, from about 4 to about 20% total dietary fiber, and a source of carbohydrates from a multiple grain source comprising a blend of sorghum and barley; a blend of corn and barley; or a blend of corn, sorghum, and barley.

8. A process for controlling hyperinsulinemia in a pet comprising the step of feeding said pet a pet food composition comprising a source of protein, a source of fat, and a source of carbohydrates from a multiple grain source comprising a blend of sorghum and barley; a blend of corn and barley; or a blend of corn, sorghum, and barley.

9. A process as claimed in claim 8 in which the weight ratio of grain sources is from about 1:5 to about 5:1.

10. A process as claimed in claim 8 in which the ratio of grain sources is about 1:1.

* * * * *